W. F. TROAST.
VEHICLE WHEEL TIRE.
APPLICATION FILED FEB. 21, 1917.
1,267,147. Patented May 21, 1918.
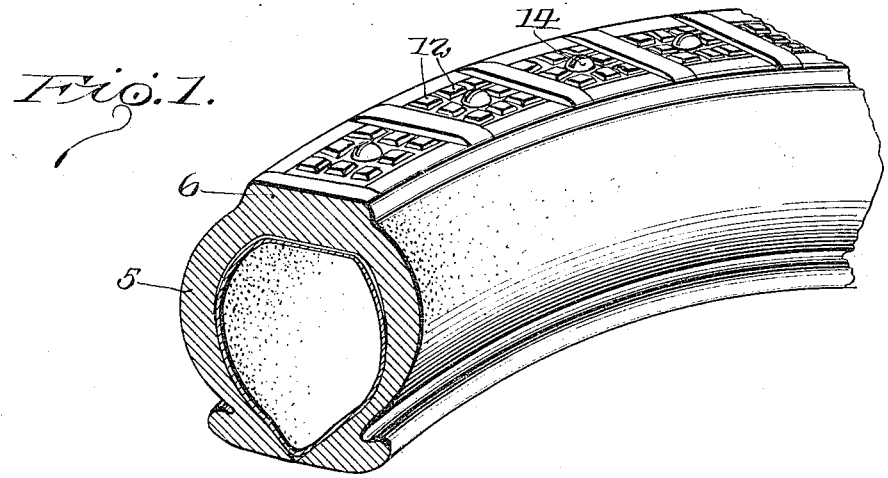
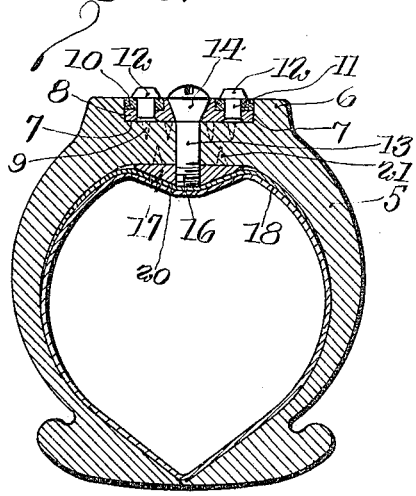
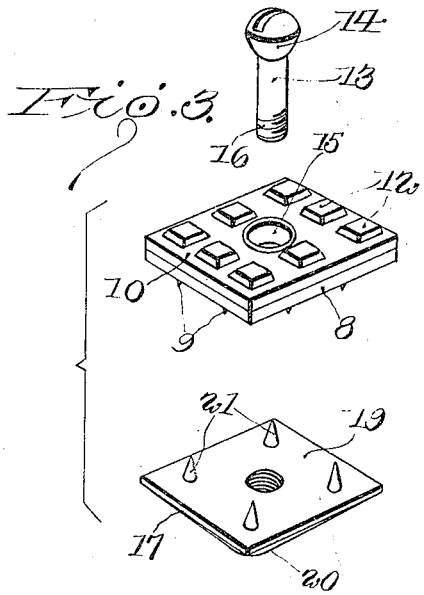
Inventor
William F. Troast
By
N. H. Byrnes
Attorney

UNITED STATES PATENT OFFICE.

WILLIAM F. TROAST, OF LANCASTER, PENNSYLVANIA, ASSIGNOR OF ONE-HALF TO FRANK B. TROUT, OF LANCASTER, PENNSYLVANIA.

VEHICLE-WHEEL TIRE.

1,267,147.

Specification of Letters Patent. Patented May 21, 1918.

Application filed February 21, 1917. Serial No. 150,094.

*To all whom it may concern:*

Be it known that I, WILLIAM F. TROAST, a citizen of the United States, residing at Lancaster, in the county of Lancaster and State of Pennsylvania, have invented certain new and useful Improvements in Vehicle-Wheel Tires, of which the following is a specification.

The present invention relates to tires for vehicle wheels and consists in the combinations and arrangements of elements hereinafter described and particularly set forth in the accompanying claim.

The invention has for its purpose to provide a means to be incorporated in the tire to the end of prolonging the use of the tire, to reduce to a minimum the liability of puncturing, and which will afford an efficient gripping tread for the tire in the traveling of the vehicle.

The invention has for its further purpose to provide a means for the aforesaid purposes which may be readily applied to the tire, which is of simple construction and cheap to manufacture and which will commend itself as a device to be adopted by makers of tires generally.

Another object of the invention is to have the tire protecting means in the form of separate units whereby any one unit may be put on or taken from the tire at will, and without in any manner disturbing the other units that have been applied.

The invention is shown by way of illustration in the accompanying drawings, wherein—

Figure 1 is a fragmentary perspective view showing the application of the device to a tire.

Fig. 2 is a transverse sectional view thereof.

Fig. 3 is a disconnected perspective view of the attachment *per se*, and

Fig. 4 is a detail sectional view of the tread block *per se*.

Referring to the construction in further detail and wherein like reference characters designate corresponding parts in the different figures shown, 5 indicates the wheel tire shoe having the usual tread portion 6, and which tread portion in the present instance is formed, in the making, with a plurality of recesses or chambers 7, that are distributed at equal intervals throughout the circumference of the tire and of a depth adapted to receive with a flush fit the tread blocks to be described.

The tread blocks consist each of a base piece 8 of metal, having a plurality of spurs or pins 9, depending therefrom and adapted to be embedded in the body of the tire after the manner illustrated in Fig. 2. The base plate 8 is cut away to receive a piece of leather or fiber 10, whose cross dimensions are the same as those of the base piece, whereby both pieces (8 and 10) may form a single block or unit, as shown in Fig. 3.

A plurality of rivets or studs 11, secure the part 10 to the piece 8, and the heads 12 of said studs are exposed an appropriate distance above the block, and tread of the tire, to provide wearing and gripping elements for the wheel, as will be understood.

Each tread block is secured to the tire by means of a bolt 13, whose head 14 is substantially conical and fits within a correspondingly formed aperture 15 in the base piece 8 (see Figs. 2 and 4). Said bolt 13 is screw-threaded to engage at 16 with the securing member 17 that is located between the inner surface of the tire shoe 5 and the inner tube 18 (see Fig. 2). Said member 17 serves in the capacity of a nut for holding the parts assembled and has a flat face 19 disposed against the inner surface of the tire shoe 5, and the inner surface thereof is curved or rounded at 20, to provide a smooth bearing surface for the inner tube 18. The securing member 17 is also provided with a plurality of spurs or pins 21 that are adapted to be embedded in the tire shoe 5 in a manner the same as that of the spurs 9 and, together therewith, the whole forms a unit whose several parts are secured firmly to the tire, and against relative movement.

It is obvious that those skilled in the art may vary the details of construction and arrangements of parts without departing from the spirit of my invention, and therefore I do not wish to be limited to such features except as may be required by the claim.

Having thus described my invention, what I claim as new and desire to protect by United States Letters Patent, is:

The combination with a vehicle wheel tire having a plurality of chambers formed in the tread portion thereof, of a plurality of wearing blocks fitting in said chambers respectively; each of said blocks comprising a metallic base piece having a centrally raised portion, a pliable member overlying said base piece surrounding said raised portion, and having its wearing surface lying flush with the wearing surface of the tire tread portion, rivets securing said pliable body to the base piece and the heads of said rivets projecting appreciably beyond the tire tread surface; and means passing through said centrally raised portions securing said wearing blocks in said chambers, substantially as set forth.

In testimony whereof I affix my signature in the presence of two witnesses.

WILLIAM F. TROAST.

Witnesses:
E. S. CLEMENT,
R. E. JONES.

Copies of this patent may be obtained for five cents each, by addressing the "Commissioner of Patents, Washington, D. C."